US008475755B2

(12) United States Patent
Dang et al.

(10) Patent No.: US 8,475,755 B2
(45) Date of Patent: Jul. 2, 2013

(54) OXIDATION CATALYST AND METHOD FOR DESTRUCTION OF CO, VOC AND HALOGENATED VOC

(75) Inventors: Zhongyuan Dang, Canton, MA (US); Nirmal Singh, Milford, MA (US); Martin Morrill, Bellingham, MA (US); Greg Cullen, Amesbury, MA (US)

(73) Assignee: Sub-Chemie Inc., Louisville, KY (US)

( * ) Notice: Subject to any disclaimer, the term of this patent is extended or adjusted under 35 U.S.C. 154(b) by 923 days.

(21) Appl. No.: 12/545,281

(22) Filed: Aug. 21, 2009

(65) Prior Publication Data

US 2011/0044874 A1    Feb. 24, 2011

(51) Int. Cl.
*B01D 53/70*    (2006.01)
*B01D 53/62*    (2006.01)
*B01J 23/63*    (2006.01)

(52) U.S. Cl.
USPC ............... 423/240 S; 423/245.1; 423/247; 502/242; 502/304

(58) Field of Classification Search
USPC ............... 423/240 S, 245.1, 247; 502/60, 74, 502/77, 78, 73, 261, 242, 304
See application file for complete search history.

(56) References Cited

U.S. PATENT DOCUMENTS

| 4,059,683 | A | 11/1977 | Lindberg et al. |
| 4,189,404 | A | 2/1980 | Keith |
| 4,303,552 | A | 12/1981 | Ernest |
| 4,426,320 | A | 1/1984 | Ernest |
| 4,477,417 | A | 10/1984 | Domesle |
| 4,478,797 | A | 10/1984 | Diwell |
| 4,490,482 | A | * 12/1984 | Mathieu .................. 502/339 |
| 4,510,265 | A | 4/1985 | Hartwig |
| 4,749,671 | A | 6/1988 | Saito |
| 4,912,082 | A | 3/1990 | Upchurch |
| 5,075,274 | A | 12/1991 | Kiyohide |
| 5,176,897 | A | 1/1993 | Lester |
| 5,202,299 | A | 4/1993 | Symons |
| 5,254,797 | A | 10/1993 | Imoto |
| 5,451,388 | A | 9/1995 | Chen et al. |
| 5,496,788 | A | 3/1996 | Domesle |
| 5,578,283 | A | 11/1996 | Chen et al. |

(Continued)

FOREIGN PATENT DOCUMENTS

EP    1075870 A1    2/2001
WO    WO9640419 A1    12/1996

(Continued)

OTHER PUBLICATIONS

Fornasiero et al. "Rh-Loaded CeO2-ZrO2 Solid Solutions as Highly Efficient Oxygen Exchagners: Dependence of the Reduction Behavior and the Oxygen Storage Capacity on the Structural Properties", 1995, Journal of Catalysis 151, 168-177.*

(Continued)

*Primary Examiner* — Wayne Langel
*Assistant Examiner* — Syed Iqbal
(74) *Attorney, Agent, or Firm* — Scott R. Cox

(57) ABSTRACT

An oxidation catalyst deposited on a substrate is described for the destruction of CO and volatile organic compounds, in particular halogenated organic compounds, from an emissions stream at temperatures from 250° C. to 450° C. The oxidation catalyst includes at least two platinum group metals, one of which is either platinum or ruthenium, supported on refractory oxides, such as a solid solution of $CeO_2$ and $ZrO_2$, and tin oxide and/or silica.

20 Claims, 5 Drawing Sheets

U.S. PATENT DOCUMENTS

| | | | |
|---|---|---|---|
| 5,614,453 | A | 3/1997 | Occelli |
| 5,628,975 | A | 5/1997 | Horiuchi |
| 5,643,545 | A | 7/1997 | Chen et al. |
| 5,653,949 | A | 8/1997 | Chen et al. |
| 5,665,322 | A | 9/1997 | Kiyohide |
| 5,866,498 | A | 2/1999 | Chattha |
| 5,876,680 | A | 3/1999 | Chattha |
| 5,895,636 | A | 4/1999 | Nguyen et al. |
| 5,961,942 | A | 10/1999 | Turner et al. |
| 6,114,268 | A | 9/2000 | Wu et al. |
| 6,132,694 | A | 10/2000 | Wood |
| 6,207,120 | B1 | 3/2001 | Belmonte et al. |
| 6,239,064 | B1 | 5/2001 | Nguyen et al. |
| 6,248,684 | B1 | 6/2001 | Yavuz |
| 6,274,107 | B1 | 8/2001 | Yavuz |
| 6,399,035 | B1 | 6/2002 | Tabata |
| 6,613,299 | B2 | 9/2003 | Dang |
| 6,756,337 | B2 | 6/2004 | Nakanishi |
| 7,052,663 | B2 * | 5/2006 | Kobayashi et al. ........ 423/245.3 |
| 7,332,454 | B2 | 2/2008 | Dang et al. |
| 2003/0144143 | A1 | 7/2003 | Jordan et al. |
| 2004/0028589 | A1 | 2/2004 | Reisinger et al. |
| 2005/0081443 | A1 | 4/2005 | Aiello et al. |
| 2006/0211569 | A1 * | 9/2006 | Dang et al. ...................... 502/60 |
| 2011/0160490 | A1 * | 6/2011 | Van Driessche .............. 568/456 |

FOREIGN PATENT DOCUMENTS

| | | |
|---|---|---|
| WO | WO2005102513 A1 | 11/2005 |
| WO | WO2006020647 A1 | 2/2006 |
| WO | WO2006037610 A1 | 4/2006 |

OTHER PUBLICATIONS

Sampson et al. "The oxidation of Carbon monoxide using a tin oxide catalyst" 1987, UKAEA, 65-76.*

Sanchez "Promotion of Ru/ZrO2 catalysts by platinum", 2002 Studies in Surface Science and Catalysis 143, 555-563.*

Miranda, Beatriz, et al., "Performance of alumina-supported noble metal catalysts for the combustion of trichloroethene at dry and wet conditions", Applied Catalysis B: Environmental 64 (2006), pp. 262-271.

Mitsui, Tomohiro, et al., "Support effect on complete oxidation of volatile organic compounds over Ru catalysts", Applied Catalysis B: Environmental 81 (2008), pp. 56-63.

International Search Report and Written Opinion with respect to international application No. PCT/US2010/046045.

* cited by examiner

OXIDATION CATALYST AND METHOD FOR DESTRUCTION OF CO, VOC AND HALOGENATED VOC

TECHNICAL FIELD

This disclosure relates to oxidation catalysts deposited on a substrate for the destruction of CO and volatile organic compounds (VOC), particularly halogenated organic compounds, from gaseous emissions streams in plants, particularly chemical plants, and processes for their use. In particular, oxidation catalysts deposited on a substrate are described, wherein the oxidation catalyst includes at least two platinum group metals, such as ruthenium and platinum, supported on a refractory oxide, comprising a solid solution of $CeO_2$ and $ZrO_2$, and either or both of tin oxide and silica. The catalysts that include the platinum group metals supported on a refractory oxide may be stabilized by addition of one or more rare earth metal oxides.

BACKGROUND ART

The treatment of gaseous emissions containing volatile organic compounds has been an increasing concern in recent years. Chemical plant off-gas emissions containing volatile organic compounds, particularly halogenated volatile organic compounds, are highly toxic pollutants for the environment and may be dangerous to human beings. Several technologies have been developed for the removal of such chemical plant off-gas emissions including thermal incineration, adsorption, and catalytic oxidation.

Thermal incineration requires high operating temperatures and high capital cost facilities. If the gaseous stream also includes halogenated compounds, thermal incineration can create toxic halogenated compounds under some conventional operating conditions. Thus, thermal incineration may not be effective.

In some circumstances, adsorption by adsorbents, such as carbon, is an alternative process for the removal of such volatile organic compounds from off-gas emissions. However, this process does not destroy the pollutants but merely concentrates them. Furthermore, adsorption efficiency can be adversely impacted by fluctuating concentrations of the volatile organic compounds that may be present in the off-gas emissions.

Alternatively, catalytic oxidation is an energy efficient and economical way of destroying off-gas emissions, such as carbon monoxide and volatile organic compound emissions. Oxidation catalysts, such as precious metal catalysts and base metal catalysts, have previously been used for the destruction of volatile organic compounds and carbon monoxide in chemical plants. However, when the volatile organic compounds to be removed contain halogenated organic compounds, traditional oxidation catalysts cannot be used because they are quickly poisoned by these halogenated organic compounds.

As an example of a current problem in the removal of halogenated organic compounds, off-gas emissions from purified terephthalic acid (PTA) production plants normally contain carbon monoxide, methyl bromide, and various VOCs. Before these off-gases can be vented to the atmosphere, these compounds must be destroyed, normally by catalytic oxidation. Current catalysts used for such oxidation process are required to operate at high temperatures to minimize or eliminate the formation of polybromobenzenes, which are solid and can cause plugging or blockage of process pipe lines.

Although prior art systems have been useful for the treatment of some types of emissions, there is still a need to develop improved catalysts for the destruction of CO and volatile organic hydrocarbons, particularly halogenated VOCs.

The present disclosure provides solutions to the aforesaid problems by offering more active catalytic compositions which oxidize VOCs, particularly halogenated organic compounds, at temperatures lower than are used for conventional oxidation catalysts, and processes for their production and use.

DISCLOSURE OF EMBODIMENTS OF THE INVENTION

One embodiment of the invention are oxidation catalysts deposited on a substrate for the destruction of CO and VOCs, particularly halogenated VOCs, from an emissions stream, wherein the oxidation catalyst comprises at least two platinum group metals, one of which preferably consists of ruthenium, with platinum as a alternative preferred platinum group metal, supported on refractory oxides comprising high surface area materials, including preferably a solid solution of $CeO_2$ and $ZrO_2$; and silica and/or tin oxide. In one embodiment, the oxidation catalyst is utilized for the destruction of off-gas emissions at temperatures from 250-450° C. The refractory oxides may be stabilized by blending with one or more rare earth metal oxides. The substrate may be a honeycomb structure, a monolithic structure or spherical beads.

Another embodiment of the invention are processes for the preparation of oxidation catalysts supported on a substrate for the destruction of CO and VOCs, particularly halogenated volatile organic compounds, from an emissions stream at temperatures from 250-450° C. The processes may comprise preparing and blending an aqueous mixture slurry of high surface area refractory oxides, such as a solid solution of $CeO_2$ and $ZrO_2$ with silica and/or tin oxide; coating the substrate with the blended aqueous mixture slurry; drying and calcining the coated substrate; depositing at least two platinum group metal precursor materials on the calcined coated substrate, such as ruthenium and platinum or ruthenium or platinum and an additional platinum group metal, and calcining the platinum group metal coated substrate. Alternatively, the platinum group metals can be blended with the other components and deposited on the substrate in a single processing step. In one embodiment, the refractory metal oxides are stabilized by the addition of one or more rare earth metal oxides that are added to the aqueous mixture.

Yet another embodiment of the invention are processes for the destruction of CO and VOCs, particularly halogenated VOCs, from off-gas emissions, particularly chemical plant off-gas emissions, comprising passing said emissions over the above-described catalyst at temperatures from 250° C.-450° C.

MODES FOR CARRYING OUT EMBODIMENTS OF THE INVENTION

Figure 1:
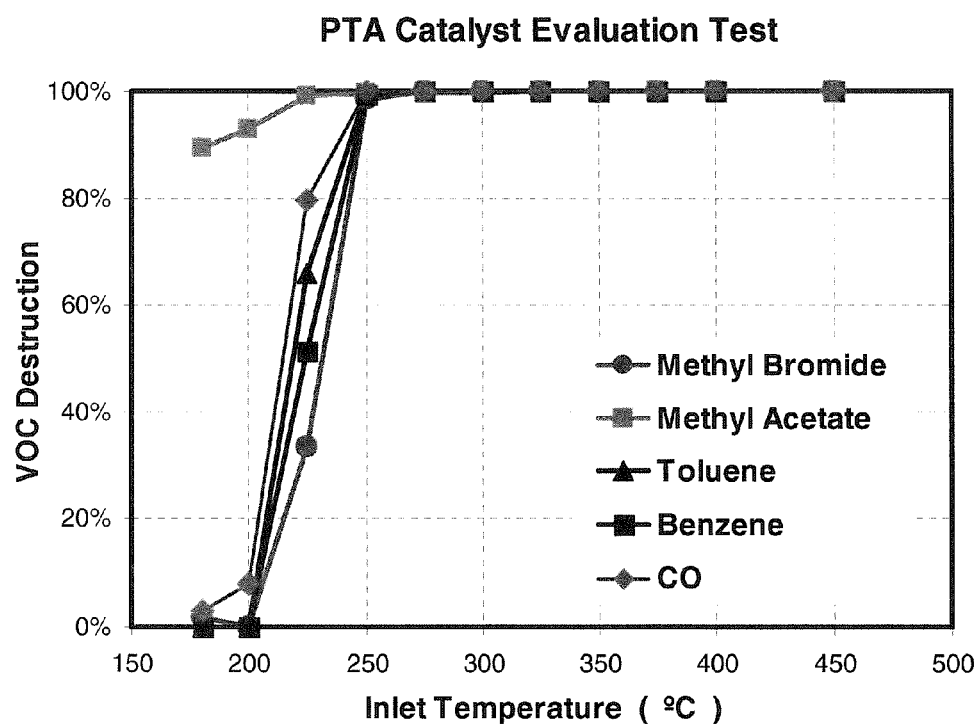
FIG. 1 is a graph showing the destruction of CO and various VOCs, including a halogenated VOC over the catalyst of Example 1.

Embodiments of the invention relate to oxidation catalysts, particularly useful for destruction of off-gas emissions, particularly VOCs, including halogenated VOCs. In particular, one embodiment of the invention relates to an oxidation catalyst deposited upon a substrate to oxidize CO and VOCs, particularly halogenated VOCs, from off-gas emissions streams at temperatures from 250° C.-450° C. The oxidation catalyst, after deposition on a substrate, can be placed in a catalytic reactor device for the off-gas destruction.

The device for destroying CO and VOCs, particularly halogenated VOCs, from an emissions stream, particularly a chemical plant off-gas emission stream, is comprised of a substrate, which has deposited thereon a catalytic material, such as an oxidation catalyst. The substrate can be selected from conventional monolith substrates and spherical beads supports, utilizing a honeycomb, monolith or foam structure through which the emissions pass. The substrate may have significant flow-through capacity so as not to prevent or restrict significantly the flow of emissions through the substrate.

The substrate may be produced from ceramic materials, such as alumina, silica, titania, zirconia, magnesia, silica-alumina, silica-zirconia, titania-zirconia, titania-silica, alumina-titania, alumina-zirconia, silicon carbide, ceramic cordierite, mullite and mixtures or combinations thereof. Alternatively, metallic or metallic alloy substrates, such as those produced from stainless steel, iron-chromium alloys, nickel-chromium-iron alloys with or with aluminum, and other such metallic substrates may be used. In one embodiment, the substrates are formed from commercially available cordierite, mullite, silicon carbide, iron-chromium alloys and stainless steel materials.

The substrate may be coated with the inventive oxidation catalyst. The oxidation catalyst may be formed from at least two platinum group metals, one of which consists of ruthenium or platinum, supported on one or more high surface area refractory oxides. In one embodiment, the platinum group metals includes ruthenium, supported on a solid solution of $CeO_2$ and $ZrO_2$, and silica and/or tin oxide. In another embodiment, the refractory oxides are stabilized with one or more rare earth metal oxides.

The platinum group metals are selected from the group consisting of ruthenium, platinum, palladium, rhodium, rhenium and osmium. In one embodiment, the preferred platinum group metals are ruthenium or platinum, preferably ruthenium, and at least one additional platinum group metal, preferably a combination of ruthenium and platinum. In another embodiment, only ruthenium and platinum are present. The choice of the platinum group metals may be influenced by the type of compounds present in the off-gas emissions. For example, it has surprisingly been discovered that ruthenium compounds are more active for the destruction of halogenated VOCs, such as methyl bromide, while platinum compounds are more active for the destruction of aromatic VOCs, such as benzene or toluene. Catalysts that contain only ruthenium and platinum perform better than catalysts which contain only one of the precious metals group. When ruthenium and platinum are used as the platinum group metals, the ratio of the ruthenium to the platinum metal deposited upon the catalyst may be from 20:1 to 1:20, and alternatively from 5:1 to 1:1. The combination of platinum and ruthenium only in the suggested ratios also performs better than combinations of two or more other precious metals, including combinations of ruthenium with a precious metal other than platinum or combinations of platinum with a precious metal other than ruthenium.

The platinum group metal precursor materials, which are supported on the one or more refractory oxides, may be selected from the group consisting of ammonium hexachlororuthenate, bis(cyclopentadienyl)ruthenium, hexaammineruthenium chloride, ruthenium chloride, ruthenium nitrosychloride, ruthernium nitrosylnitrate, ruthenium acetate, rutheniumoxide-hydrate, ruthenium acetylacetonate, tetrapropylammonium ruthenate, hexaammine ruthenium chloride, ruthenium oxide, platinum nitrate, platinum sulfite acid, ammonium platinum sulfite, dihydrogen hexahydroxyplatinate, hydrogen tetranitroplatinate, ammonium hexachloro platinate, dihydrogen hexahydroxy platinate, platinum acetylacetonate, platinum chloride, bis(ethanalammonium)-hexahydroxoplatinate, tetraammineplatinum nitrite, tetraammineplatinum nitrate, tetraammineplatinum hydroxide, platinum oxalate and other similar compounds and mixtures thereof.

The platinum group metal components may be supported on one or more high surface area refractory oxides. Generally, the surface area of the refractory oxides may be more than 50 $m^2/g$, and alternatively, greater than about 100 to about 800 $m^2/g$. The surface area referred to may be determined by a nitrogen physisorption method.

The refractory oxides chosen as the support may include at least cerium oxide and zirconium oxide, formed as a solid solution, with the ceria cubic structure crystal phase retained. For purposes of this disclosure, a "solid solution" consists of a uniform mixture of substances in solid form. Solid solutions often consist of two or more types of atoms or molecules that share a crystal lattice. In a one embodiment the zirconium oxide molecules share the cubic crystal structure with the ceria and the monoclinic or tetragonal crystal structure commonly associated with zirconia is generally not retained. The refractory oxides may also include other oxides of one or more compounds of Groups IIIB, III and IV, including alumina, silica, titania, zirconia, silica-alumina, alumina-zirconia, alumina-titania, silica-titania, silica-zirconia, and titania-zirconia. However, in one embodiment, the preferred refractory oxides are ceria and zirconia, more preferably a solid solution of ceria-zirconia. When a solid solution of $CeO_2$ and $ZrO_2$ is used, the $ZrO_2$ comprises from about 1-50 wt % of the solid solution.

To enhance the stability of the refractory oxides to receive the platinum group metals, the refractory oxides may be stabilized by treatment with at least one rare earth oxide selected from lanthanum oxide, praseodymium oxide, neodymium oxide, gadolinium oxide, and yttrium oxide. In one embodiment, a combination of lanthanum oxide and praseodymium oxide is present. The quantity of the rare earth oxides comprises about to about 5 wt % of the total of the combination of the refractory oxides and the rare earth oxides only.

An additional component of the oxidation catalyst may be silica and/or tin oxide. Silica may be used as an alternative to tin oxide depending on the composition of the emissions stream. Thus, in some circumstances, silica is preferable to tin oxide. Alternatively, depending on the emissions stream, the oxidation catalyst may contain tin oxide without silica or in combination with silica.

The silica may be a precipitated silica powder which has an amorphous phase with a surface area more than 200 m²/g, a larger pore size greater than 100 angstrom, and a particle size average from 0.5 to 12 microns. Other types of amorphous silica, such as mesoporous molecular sieves MCM-41 and SBA-15, can be also used. These molecular sieves MCM-41 and SBA-15 also have large surface area, being greater than 200 m²/g, larger pore volumes and uniform pore-size distributions of more than 100 angstrom, thereby allowing for higher dispersions of active components and better control on the particle size, as compared with conventional amorphous silica. Fumed silica, that may have larger surface area, is less desirable as a catalyst support due to its low porosity. Silica used as a support is especially useful for enhancing the activity of catalytic oxidation of CO and various VOC hydrocarbons, especially for oxidation of aromatic compounds. Silica has significantly lower surface acidity that leads to very weak capability to adsorb halogenated compounds, especially HBr/$Br_2$ for PTA plant off-gas destruction, which may result in poisoned catalysts. By using silica, the quantity of platinum group metals can be decreased while still achieving the same level of oxidation activity.

Tin oxide may be includes as an additional, or alternative, component of the oxidation catalyst that is deposited upon the substrate. The tin oxide may be used as an alternative or in addition to silica. Tin oxide is especially useful for the oxidation of CO and various specific hydrocarbon materials. Tin oxide has significant oxygen storage capacity and can generate active oxygen for the oxidation of the hydrocarbon compounds. By using tin oxide, the quantity of platinum group metals can be decreased while still achieving the same level of oxidation activity. If tin oxide is added, it can be added in the form of particles with a size from about 1 micrometer to about 20 micrometers. Usually, commercial tin oxide products have low surface area. Notwithstanding, it is believed to enhance the catalyst performance for destruction of CO and aromatic VOC. Large surface area tin oxide, which may be stabilized by silica, greatly enhances catalyst performance. In one embodiment, it is preferred that tin oxide has a surface area from about 2 m²/g to about 200 m²/g.

In an alternative embodiment, a combination of silica and tin oxide may be used, depending on the composition of the off-gas.

The oxidation catalyst of the invention may contain at least two platinum group metal compounds supported on the refractory oxide that may include a solid solution of $CeO_2$ and $ZrO_2$, with silica and/or tin oxide. In one embodiment, the concentration of the platinum group metal precursors, by weight, should be sufficient to obtain a metal loading of from 10-200 g/cf (0.35 g/l to 7.0 g/l), preferably from 50-100 g/cf (1.7 g/l to 3.5 g/l) of the oxidation catalyst.

The concentration of the refractory oxides, such as the solid solution of $CeO_2$ and $ZrO_2$, may be from about 10% to about 95% by weight of the oxidation catalyst, and alternatively, from about 50% to about 90%. This quantity may include any rare earth metal oxides added to the refractory oxides to enhance their capabilities. The concentration of the silica and/or tin oxide may be from about 5% to about 50%, and alternatively, 10% to about 30%.

Depositing the catalyst material on the walls of the substrate, such as a honeycomb or monolithic structure, can be carried out by several processes. In one preferred process, the oxidation catalyst is washcoated onto the substrate. During the washcoating process, the refractory oxides, preferably stabilized with one or more rare earth oxides, silica and/or tin oxide, can be mixed together with water to form an aqueous mixture slurry. The aqueous mixture slurry may also contain a binder material. Suitable binder materials include, but are not limited to, colloidal alumina, colloidal silica, colloidal zirconia, colloidal ceria and conventional binders. The percentage of the binder in the aqueous mixture slurry can be in the range of 1-10%, by weight. Following the mixing of the components in the aqueous solution, the composition can be milled for a period from 1 to 24 hours to achieve a consistent composition and particle size. The substrate can be then coated with the aqueous mixture slurry and any extra slurry can be removed by air knifing or vacuum suction. After removing the extra aqueous mixture slurry, the coated substrate can be dried at a temperature of about 100° C. to 150° C. for about 8 hours followed by calcining at a temperature from about 500° C. to about 600° C. for about 3 hours to secure the material to the substrate.

Following impregnation of the coated substrate with the mixture of materials, the platinum group metal components can be then impregnated onto the coated substrate. In one preferred embodiment, this impregnation process can be accomplished by bringing the coated substrate into contact with an aqueous solution of the precious metal salts, preferably ruthenium and platinum salts alone or alternatively ruthenium or platinum salts and at least one other platinum group metal salt, using an incipient wetness impregnation process. In one embodiment, the preferred platinum salt is platinum nitrate and the preferred ruthenium salt is ruthenium nitrate. The coated substrate can be coated with the platinum group metal salts in an aqueous solution. It can be then dried at a temperature from about 100° C. to 150° C. and calcined at about 300° C. to about 600° C. preferably 300° C. to 450° C. for about 3 hours.

The formation of the oxidation catalyst on the substrate can also be accomplished in a one step deposition and calcination process. In this process, the platinum group metal compounds can be added to the slurry of at least ceria and zirconia, preferably in the form of a solid solution, tin oxide and/or silica and a binder followed by milling, coating, drying and calcination steps.

Once the substrate is coated with the oxidation catalyst and calcined, it can be placed in the exhaust emission control device for oxidative destruction of CO and VOCs, particularly halogenated VOCs, including brominated VOCs. The exhaust gas, which contains CO and VOCs, including halogenated VOCs, contacts the catalyst, that can be deposited on a monolith substrate, with an effective amount of oxygen at temperatures from 200° C. up to 500° C. and is oxidized into $CO_2$, water, and halogen-acid/halogens.

The various catalyst embodiments of the invention typically have high activity for oxidation of these compounds. The light off temperatures for the destruction of these VOCs is typically lower than 250° C., as illustrated in FIG. 1. This temperature is significantly lower than has been used with prior art catalysts.

The catalysts may operate at a space velocity (GHSV) of 1000-100,000 $h^{-1}$, and alternatively from 5,000-50,000 $h^{-1}$, to achieve enhanced catalyst performance. The preferred space velocity can be obtained by increasing or deceasing catalyst volumes in the catalytic oxidation reactors.

The catalyst can operate within a large temperature window from about 200° C. up to about 500° C., and alternatively from 250° C. to 450° C., to achieve complete oxidation of CO and various VOCs which include halogenated organic compounds from chemical plant off-gas emissions with an effective amount of oxygen. The amount of oxygen present depends on the quantity of VOCs that are present in the off-gas emissions. The range of operation temperatures can be controlled by injecting some assistant fuels, which are more easily volatilized organic compounds, into the off-gas exhaust stream. These assistant fuels are generally available in chemical plant processes and may include methanol, ethanol, methyl-acetate, aromatic compounds, synthesis gas, nature gas and other similar organic compounds and mixtures thereof.

The catalyst can also be designed to operate in high pressure reactor system. The working pressure can be from atmospheric to 300 psi (2.1 MPa), or alternatively, from 100-200 psi. (0.6-1.4 MPa). For example, in PTA production application, the catalytic oxidation reactor can be installed before the off-gas expander for high pressure operations or after the off-gas expander for low pressure operations.

EXAMPLES

The invention is further illustrated by the following examples:

Example 1

Figure 5:
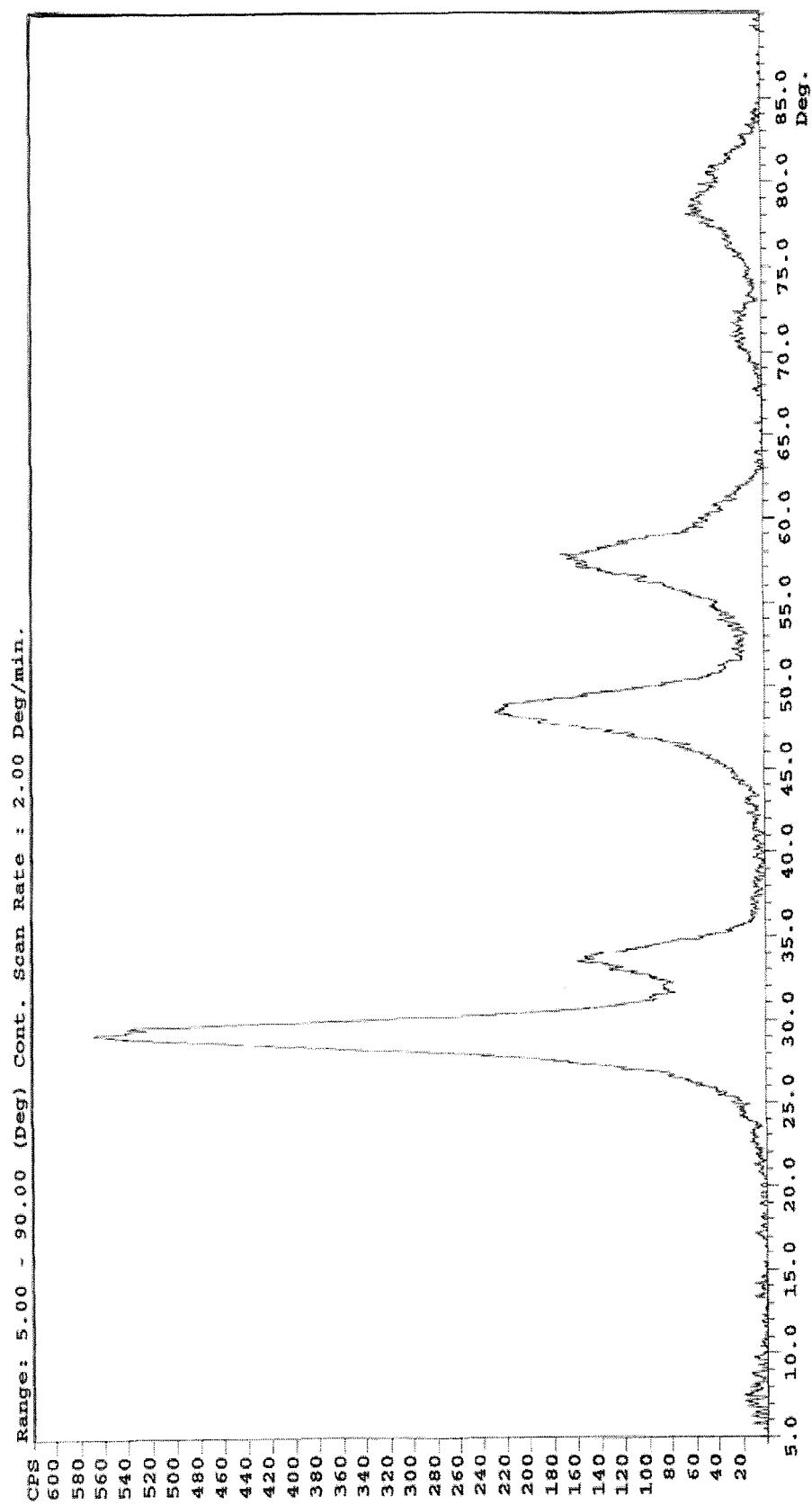
FIG. 5 is a graph showing the XRD of a solid solution of La-doped ceria-zirconia with single phase ceria cubic structure, which is used in Example 1.

A washcoat slurry (alternatively referred to as an "aqueous mixture slurry") is prepared by mixing 1000 g of a La-doped ceria-zirconia powder (LCZ powder from Tianjiao Co. China), containing a solid solution of 23% zirconia and 72% ceria and 5% $La_2O_3$ with a surface area of 125 $m^2/g$ and a single phase ceria cubic structure (see FIG. 5), 150 g of silica (Davicat SI1203 from W. C. Grace) with 1.5 liters of water, followed by milling the mixture for 10 hours. A ceramic honeycomb substrate supplied by Corning having a diameter of 1.75 inches (4.45 cm), a length of 2 inches (5.08 cm), and a cell density of about 400 cells per square inch, cpsi, (62 cells per square cm) is dipped into the washcoat slurry. Extra slurry is blown out using an air-knife. The coated honeycomb is then dried at 120° C. for 8 hours and calcined at 550° C. for 3 hours. The resulting washcoat loading is 175 g/l. A ruthenium nitrate/platinum nitrate solution is deposited on the coated substrate by an incipient wetness impregnation, followed by drying at 120° C. for 8 hours and calcination at 400° C. for 3 hours. The resulting loading is 2.1 g/l of ruthenium and 1.0 g/l of platinum. The performance of the catalyst is illustrated in FIG. 1.

Example 2

Figure 2:
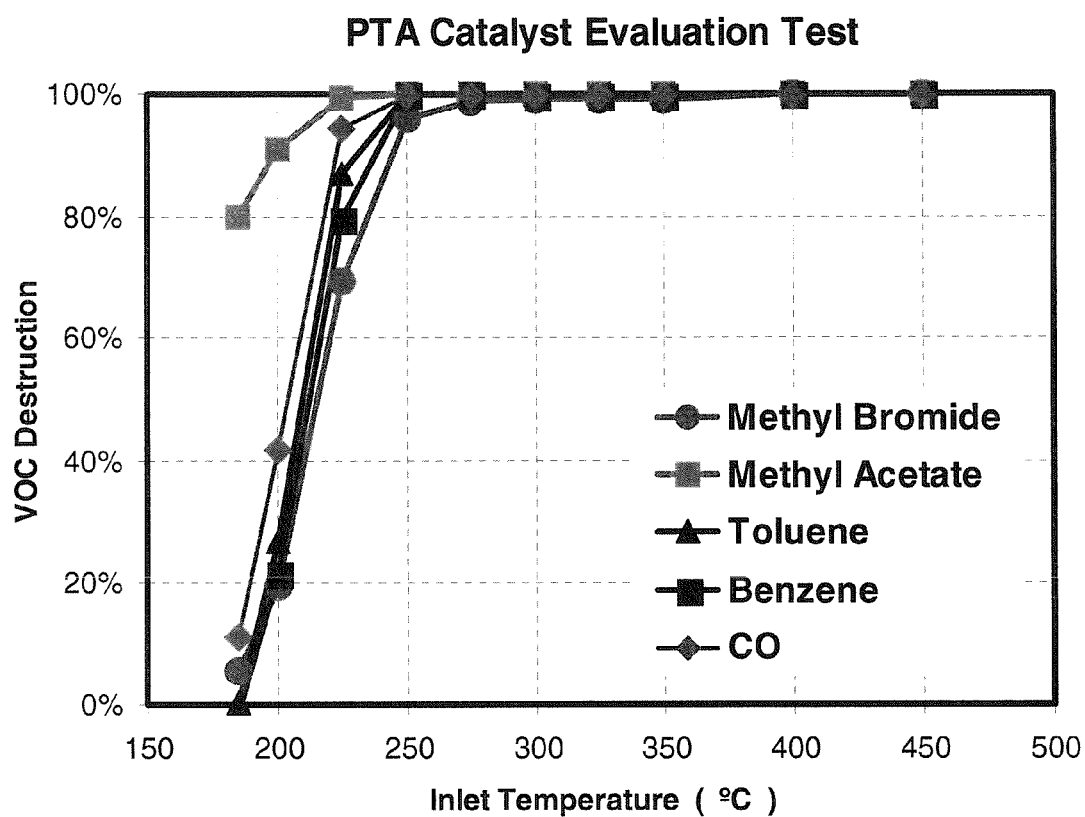
FIG. 2 is a graph showing the destruction of CO and various VOCs, including a halogenated VOC over the catalyst of Example 2.

A washcoat slurry is prepared by mixing 1000 g of a solid solution of ceria and zirconia from Rhodia having 20% zirconia and 80% ceria and 150 g tin oxide from MEI (Magnesium Elektron Inc) with 1.5 liters of water, followed by milling the mixture for 10 hours. A ceramic honeycomb substrate supplied by Corning, having the same dimensions of the substrate described in Example 1 is dipped into the washcoat slurry. Extra slurry is blown out using an air-knife. The coated honeycomb is then dried at 120° C. for 8 hours and calcined at 550° C. for 3 hours. The resulting washcoat loading is 175 g/l. A ruthenium nitrate/platinum nitrate solution is deposited on the coated substrate by an incipient wetness impregnation, followed by drying at 120° C. for 8 hours and calcination at 550° C. for 3 hours. The resulting loading is 2.2 g/l of ruthenium and 1.0 g/l of platinum. The performance of the catalyst is illustrated on FIG. 2.

Comparative Example 3

Figure 3:
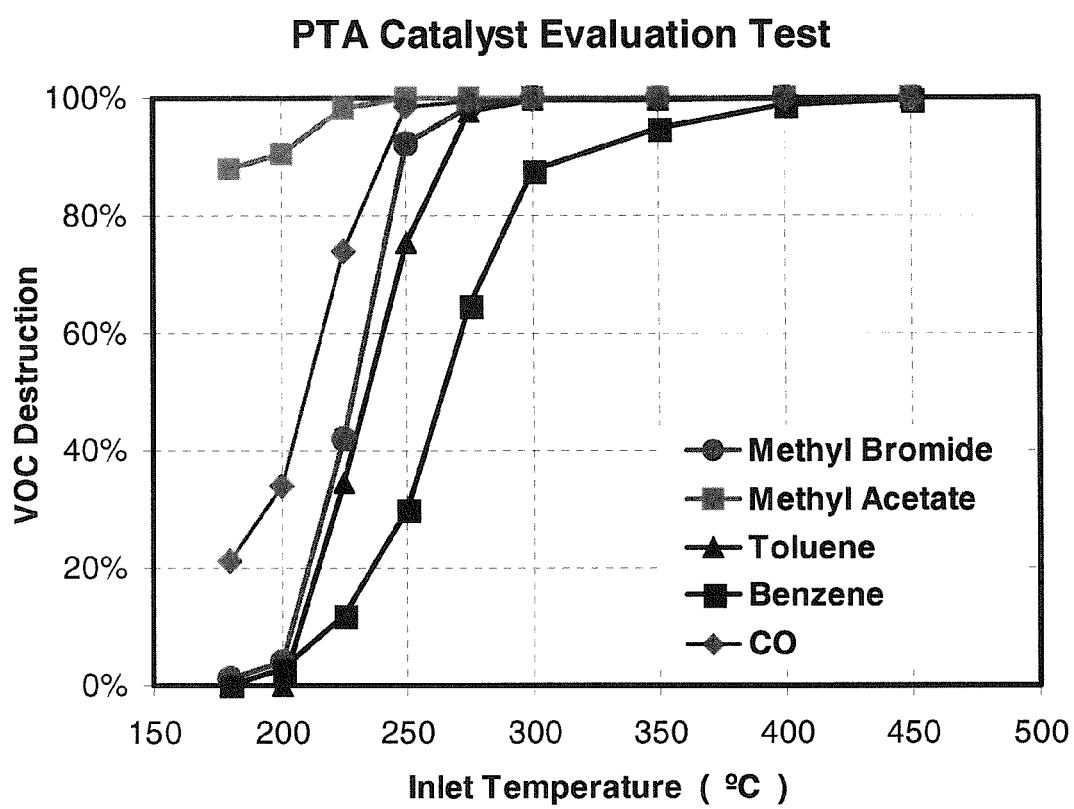
FIG. 3 is a graph showing the destruction of various organic compounds including a halogenated VOC over the catalyst of comparative Example 3.

A washcoat slurry is prepared by mixing 1000 g of a solid solution of ceria and zirconia from Rhodia having 20% zirconia and 80% ceria and silica from W. C. Grace with 1.5 liters of water, followed by milling the mixture for 10 hours. A ceramic honeycomb substrate supplied by Corning having the same dimensions as described in Example 1 is dipped into the washcoat slurry. Extra slurry is blown out using an air-knife. The coated honeycomb is then dried at 120° C. for 2-3 hours and calcined at 550° C. for 3 hours. The resulting washcoat loading is 175 g/l. A ruthenium nitrate solution is deposited on the coated substrate by an incipient wetness impregnation, followed by drying at 120° C. for 8 hours and calcination at 550° C. for 3 hours. The resulting loading is 2.5 g/l of ruthenium. The performance of the catalyst is shown in FIG. 3.

Comparative Example 4

Figure 4:
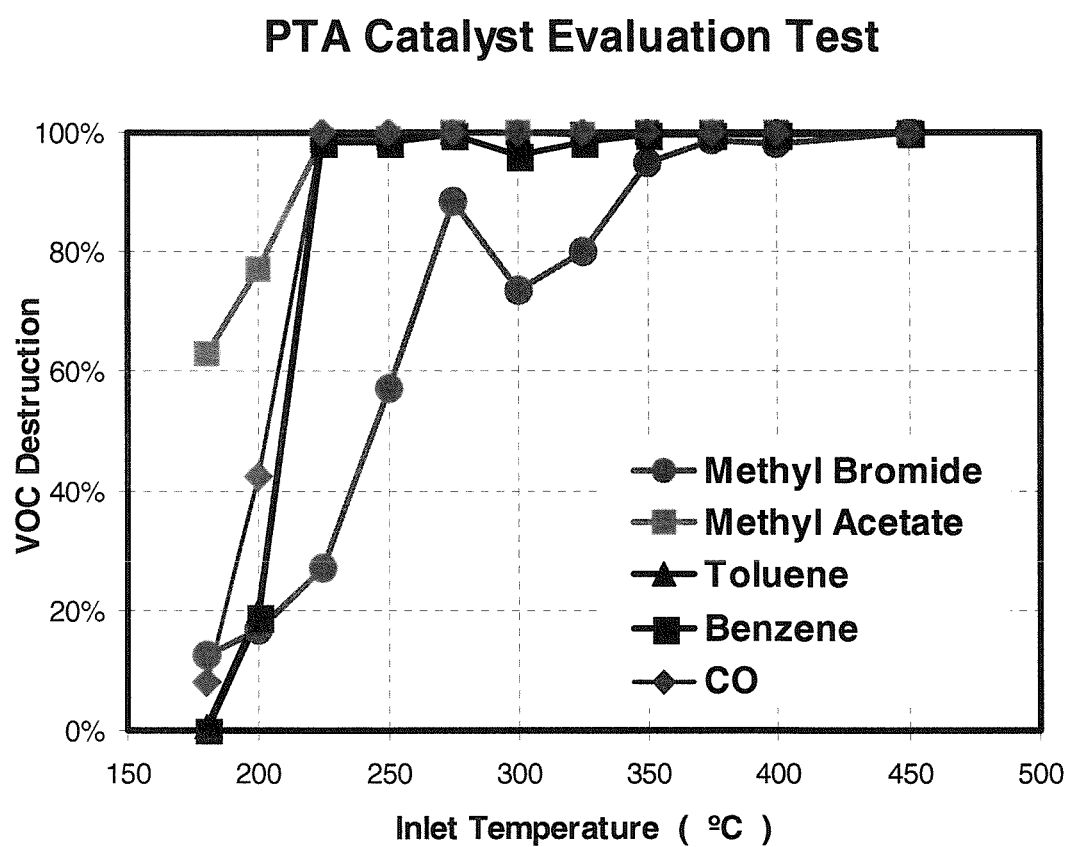
FIG. 4 is a graph showing the destruction of various organic compounds including a halogenated VOC over the catalyst of comparative Example 4.

A washcoat slurry is prepared by mixing 1000 g of a solid solution of ceria and zirconia from Rhodia, having 20% zirconia and 80% ceria and silica from W. C. Grace with 1.5 liters of water, followed by milling the mixture for 10 hours. A ceramic honeycomb substrate supplied by Corning having the same dimensions of the substrate described in Example 1 is dipped into the washcoat slurry. Extra slurry is blown out using an air-knife. The coated honeycomb is then dried at 120° C. for 8 hours and calcined at 550° C. for 3 hours. The resulting washcoat loading is 175 g/l. A tetraammineplatinum nitrate solution is deposited on the coated substrate by an incipient wetness impregnation, followed by drying at 120° C. for 8 hours and calcination at 550° C. for 3 hours. The resulting loading is 1.24 g/l of platinum. The performance of the catalyst is shown in FIG. 4.

The resulting catalysts were tested in a laboratory reactor. The testing gas composition contained 3000 ppm CO; 250 ppm methyl-acetate, 20 ppm benzene, 20 ppm toluene; 50 ppm methyl bromide; 3% $H_2O$; 3% $O_2$ with the remaining portion being nitrogen. The test space velocity was 25,000 $h^{-1}$. The results are shown in FIGS. 1-4. A SRI8610C GC and NDIR CO analyzer was used for monitoring the oxidation reaction.

The results show that the various embodiments of the inventive catalysts are highly active for the oxidation of CO and various organic compounds, including halogenated organic compounds. From the test results, catalysts with both ruthenium and platinum showed a better performance for destruction of VOC and halogenated VOC (see FIGS. 1 and 2). When the catalyst only contained ruthenium as a precious metal, it exhibited a better performance for the halogenated VOC, methyl-bromide, but not for other VOCs (see FIG. 3). When the catalyst only contained platinum as a precious metal, it showed a better performance for some VOC destruction but not for the destruction of halogenated VOC methyl-bromide (see FIG. 4).

The invention claimed is:

1. An oxidation catalyst for the destruction of CO and volatile organic compounds, in particular halogenated organic compounds, from an emissions stream, wherein the oxidation catalyst comprises
    at least two platinum group metals, one of which comprises ruthenium or platinum,
    a refractory oxides support comprising a solid solution of $CeO_2$ and $ZrO_2$; and
    tin oxide having a surface area from about 2 $m^2/g$ to 200 $m^2/g$ and a particle size from about 1 to 20 micrometers.

2. The oxidation catalyst of claim 1 deposited on a substrate having a honeycomb or a monolithic structure wherein the substrate is produced from the group consisting of cordierite, mullite, iron-chromium alloy and stainless steel.

3. The oxidation catalyst of claim 1 wherein the two platinum group metals comprise ruthenium and platinum.

4. The oxidation catalyst of claim 1 wherein the platinum group metals consist essentially of ruthenium and platinum.

5. The oxidation catalyst of claim 3 wherein the ratio of ruthenium to platinum is 20 to 1 to 1 to 20.

6. The oxidation catalyst of claim 1 wherein the refractory oxides support is stabilized by blending with one or more rare earth metal oxides.

7. The oxidation catalyst of claim 6 wherein the rare earth metal oxides are selected from the group consisting of lanthanum oxide, cerium oxide, yttrium oxide, praseodymium oxide, neodymium oxide, and mixtures thereof.

8. The oxidation catalyst of claim 2 wherein the platinum group metals are deposited on the substrate at a loading that comprises from about 10 to about 200 g/cf (0.35 g/L to 7.1 g/L).

9. The oxidation catalyst of claim 1 wherein the oxidation catalyst further comprises silica, which comprises from about 5% to about 50%, by weight, of the oxidation catalyst.

10. The oxidation catalyst of claim 1 wherein the oxidation catalyst further comprises silica selected from the group consisting of amorphous silica, precipitated silica, molecular sieves, MCM-41, SBA-15, and combinations thereof.

11. The oxidation catalyst of claim 1 wherein the oxidation catalyst further comprises silica comprising amorphous silica with a surface area more than about 200 $m^2$/g, a pore size greater than about 100 angstrom and a particle size from about 0.5-20 micrometers.

12. The catalyst of claim 1 wherein the refractory metal oxides comprise from about 10% to about 95%, by weight of the oxidation catalyst.

13. The oxidation catalyst of claim 1 wherein the tin oxide comprises about 5% to about 50%, by weight of the oxidation catalyst.

14. A process for the production of an oxidation catalyst deposited on a substrate for the destruction of CO and volatile organic compounds, in particular halogenated organic compounds, from an emissions stream comprising
preparing an aqueous mixture slurry comprising a solid solution of $CeO_2$ and $ZrO_2$, and one or both members selected from the group consisting of tin oxide and silica to form a mixture;
blending the mixture;
coating a substrate with the blended mixture;
drying and calcining the coated substrate;
depositing at least two platinum group metal precursor materials, comprising at least one of platinum and ruthenium, on the calcined coated substrate; and
drying and calcining the platinum group metals coated substrate.

15. The process of claim 14 wherein the aqueous mixture slurry is blended with a binder selected from the group consisting of colloidal alumina, colloidal silica, colloidal titania, colloidal zirconia, colloidal ceria and mixtures thereof.

16. A process for the production of an oxidation catalyst for the destruction of CO and volatile organic compounds, in particular halogenated organic compounds, from an emissions stream comprising
depositing at least two precious metal precursors on at least one component comprising a solid solution of $CeO_2$ and $ZrO_2$, and one or both members selected from the group consisting of tin oxide and silica to form a mixture;
blending the mixture;
coating a substrate with the blended mixture;
drying and calcining the coated substrate.

17. A method for treating a gas stream that contains CO and VOCs, including halogenated VOCs, and mixtures thereof, the method comprising
combining a gas stream that contains CO and VOCs, including halogenated VOCs, with oxygen; and
contacting the combined oxygen-gas stream with the catalyst of claim 1 at a temperature from about 200° C. to 500° C.

18. The method of claim 17 wherein the gas stream comprises at least one halogenated organic compound.

19. The method of claim 17 wherein the gas stream comprises a brominated organic compound.

20. An oxidation catalyst for the destruction of CO and volatile organic compounds, in particular halogenated organic compounds, from an emissions stream, wherein the oxidation catalyst comprises
at least two platinum group metals, comprising ruthenium and platinum, wherein the ratio of ruthenium to platinum is 20 to 1 to 1 to 20,
a refractory oxides support comprising a solid solution of $CeO_2$ and $ZrO_2$; and
one or both members selected from the group consisting of silica and tin oxide.

* * * * *